United States Patent
Keithley

(10) Patent No.: US 8,379,260 B2
(45) Date of Patent: Feb. 19, 2013

(54) LASER OSCILLATING MIRROR SUPPORT FOR COLOR PRINTER

(75) Inventor: Douglas G. Keithley, Boise, ID (US)

(73) Assignee: Marvell World Trade Ltd., St. Michael (BB)

( * ) Notice: Subject to any disclaimer, the term of this patent is extended or adjusted under 35 U.S.C. 154(b) by 1257 days.

(21) Appl. No.: 12/171,873

(22) Filed: Jul. 11, 2008

(65) Prior Publication Data

US 2009/0015882 A1    Jan. 15, 2009

Related U.S. Application Data

(60) Provisional application No. 60/949,617, filed on Jul. 13, 2007.

(51) Int. Cl.
*G06K 15/00* (2006.01)
*B41J 2/435* (2006.01)
*B41J 2/47* (2006.01)

(52) U.S. Cl. ....... 358/1.16; 358/1.18; 347/224; 347/225

(58) Field of Classification Search ............ 347/224, 347/225; 358/1.16, 1.18
See application file for complete search history.

(56) References Cited

U.S. PATENT DOCUMENTS

2006/0238604 A1* 10/2006 Shin .................... 347/225
2006/0243886 A1* 11/2006 Nomura et al. .......... 250/208.1
2007/0046767 A1    3/2007 Toyama et al.

FOREIGN PATENT DOCUMENTS

JP        200762099    3/2007

* cited by examiner

*Primary Examiner* — Twyler Haskins
*Assistant Examiner* — Fred Guillermety

(57) ABSTRACT

Systems, apparatuses, and methods for pre-rendering image data for a plurality of scanning paths are described here. The method includes receiving image data including a plurality of scan lines for a top portion of an image page, pre-rendering the data for a first scanning path to generate a first data set, pre-rendering the data for a second scanning path to generate a second data set, determining an initial scanning direction, and selecting the first data set or the second data set responsive to said determining. Other embodiments may be described and claimed.

22 Claims, 3 Drawing Sheets

LASER OSCILLATING MIRROR SUPPORT FOR COLOR PRINTER

CROSS-REFERENCES TO RELATED APPLICATIONS

This present application is a non-provisional application of provisional application 60/949,617, filed on Jul. 13, 2007, and claims priority to said provisional application. The specification of said provisional application is hereby incorporated in its entirety, except for those sections, if any, that are inconsistent with this specification.

TECHNICAL FIELD

Embodiments of the present invention relate to the field of laser printing and, in particular, to laser oscillating mirror support for color printing.

BACKGROUND

Laser printers are becoming increasingly popular these days, partly because of their superior print quality. In a laser printer, an image may be produced by direct scanning of a laser beam across the printer's photoreceptor.

Many inkjet printers and dot-matrix printers may simply take an incoming stream of image data and directly imprint it in a slow lurching process that may include pauses as the printer waits for more data. A laser printer may be unable to work this way because the image of an entire page may be needed to output to the printing device in a rapid, continuous process. The scanning of the laser beam over the printer's photoreceptor may not be stopped until an image of an entire page is transferred to the photoreceptor, without creating a visible gap or misalignment of the dots on the printed page.

SUMMARY OF THE INVENTION

In various embodiments, the present invention provides laser oscillating mirror support for color printing. More specifically, there is provided, in accordance with various embodiments of the present invention, a method for receiving data, pre-rendering the data for a first scanning path to generate a first data set, pre-rendering the data for a second scanning path to generate a second data set, determining an initial scanning direction, and selecting the first data set or the second data set responsive at least in part to said determining. The method may further comprise associating the first scanning path with a first possible initial scanning direction, and associating the second scanning path with a second possible initial scanning direction.

In various embodiments, the method may further comprise selecting the first data set if the determined initial scanning direction corresponds to the first possible initial scanning direction and selecting the second data set if the determined initial scanning direction corresponds to the second possible initial scanning direction. The method may further comprise discarding whichever of the first data set or the second data set that is not selected. In various embodiments, said received data may include a plurality of scan lines corresponding to a top portion of an image page.

The method may further comprise determining a third scanning path for a plurality of scan lines corresponding to a bottom portion of the image page, responsive at least in part to the determined initial scanning direction, rendering the selected data set corresponding to the top portion of the image page by scanning a laser beam modulated by the selected data set, and subsequently rendering the plurality of scan lines corresponding to the bottom portion responsive at least in part to the determined third scanning path by scanning the laser beam modulated by the plurality of scan lines corresponding to the bottom portion.

The method may further comprise initially scanning a laser beam, modulated by the selected data set, in the determined initial scanning direction, and subsequently, scanning the laser beam, modulated by the selected data set, alternately in a first scanning direction and a second scanning direction. The laser beam may be scanned using an oscillating mirror; and the oscillating mirror may be controlled by a galvanometer.

The method may further comprise determining the initial scanning direction responsive at least in part to determining a position of the galvanometer, and the pre-rendering the data for the first scanning path may further comprises buffering the data in a first buffer. Said pre-rendering the data for the first scanning path and said pre-rendering the data for the second scanning path may be performed substantially concurrently. Alternatively, said pre-rendering the data for the second scanning path may be performed subsequent to said pre-rendering the data for the first scanning path.

There is provided, in accordance with various embodiments of the present invention, an apparatus comprising a processing unit configured to receive data and pre-render said data for a first scanning path to generate a first data set, and further configured to pre-render said data for a second scanning path to generate a second data set; a detector configured to detect an initial scanning direction; and a selector configured to select the first data set or the second data set responsive at least in part to the detected initial scanning direction. The first scanning path may be associated with a first possible initial scanning direction, the second scanning path may be associated with a second possible initial scanning direction, and the selector may be further configured to select the first data set if the detected initial scanning direction corresponds to the first possible initial scanning direction and the second data set if the detected initial scanning direction corresponds to the second possible initial scanning direction.

The apparatus may further comprise a laser generating unit configured to generate a laser beam responsive at least in part to the selected data set; and a laser scanning unit configured to scan the generated laser beam in the first or second scanning path corresponding to the selected data set. The processing unit may comprise a first buffer configured to buffer the first data set. The first data set may include a plurality of scan lines from a top portion of an image page, configured to be scanned in the first scanning path; and the second data set may include the plurality of scan lines from the top portion of the image page, configured to be scanned in the second scanning path. The processing unit may be further configured to determine a third scanning path for a plurality of scan lines from a remaining portion of the image page responsive at least in part to the detected initial scanning direction.

The apparatus may further comprise a laser generating unit configured to generate a laser beam responsive at least in part to the selected data set; and subsequently generate the laser beam corresponding to the third scanning path, responsive at least in part to the plurality of scan lines from the remaining portion of the image page. The laser scanning unit may comprise a galvanometer configured to drive an oscillating mirror to scan the laser beam over a photoreceptor.

There is provided, in accordance with various embodiments of the present invention, an apparatus comprising means for receiving data including a plurality of scan lines corresponding to a top portion of an image page; means for pre-rendering the data for a first scanning path to generate a first data set; means for pre-rendering the data for a second scanning path to generate a second data set; means for determining an initial scanning direction; means for selecting the first data set or the second data set responsive at least in part to said determined initial scanning direction; means for determining a third scanning path for a plurality of scan lines corresponding to a bottom portion of the image page, responsive at least in part to the determined initial scanning direction; means for rendering the selected data set by scanning a laser beam modulated by the selected data set; and means for subsequently rendering the plurality of scan lines corresponding to the bottom portion by scanning the laser beam modulated by the plurality of scan lines corresponding to the bottom portion responsive at least in part to the determined third scanning path.

There is provided, in accordance with various embodiments of the present invention, a machine-accessible medium having associated instructions, which, when executed, results in a machine receiving data; pre-rendering the data for a first scanning path to generate a first data set; pre-rendering the data for a second scanning path to generate a second data set; detecting an initial scanning direction; and selecting the first data set or the second data set responsive at least in part to said detecting.

The associated instructions, when executed, may further result in the machine associating the first scanning path with a first possible initial scanning direction; associating the second scanning path with a second possible initial scanning direction; initially scanning a laser beam in the detected initial scanning direction responsive at least in part to the selected data set; and subsequently scanning the laser beam alternately in a first scanning direction and a second scanning direction responsive at least in part to the selected data set.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional. The phrase "A/B" means "A and/or B," i.e., its means (A), (B), or (A and B).

In various embodiments, for the purpose of this disclosure, an image to be printed on a paper may be referred as an image page. Each image page may include a plurality of scan lines of image, the number of scan lines based on the resolution of the laser printer and the length of the image. For example, an image of 1 inch length in a 600 dots per inch (dpi) laser printer may include 600 scan lines. Accordingly, if an image page is 10 inches long, 6000 scan lines (600 for each inch) may be included in the image page.

Figure 1:
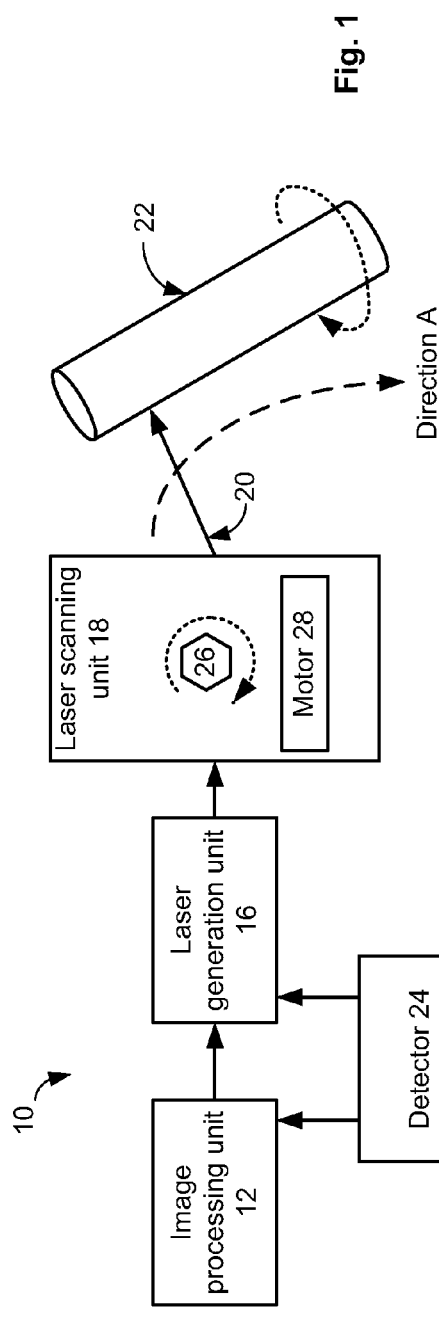
FIG. 1 illustrates a block diagram of an exemplary laser printer.

FIG. 1 illustrates a block diagram of an exemplary laser printer 10. As would be apparent to those skilled in the art, only the relevant components of a laser printer 10 are illustrated in the figure for clarity.

In various embodiments, the laser printer 10 may include a laser generation unit 16, which may generate a laser beam in response to image data received from an image processing unit 12. The generated laser beam may be suitably modulated by the image data received from the image processing unit 12. The generated laser beam may pass through a laser scanning unit 18, which may perform exposure scanning of the laser beam over a photoreceptor 22. The laser scanning unit 18 may include a rotating polygon mirror 26 and a series of other reflecting surfaces and/or lenses (not shown) to deflect the laser beam. In various embodiments, the mirror 26 may be driven by a motor 28. With the rotation of the polygonal mirror 26, the laser beam may be scanned over the photoreceptor 22. The motor 28 may rotate in a preset direction only (clockwise or counterclockwise), which may result in a preset rotational direction of mirror 26 (an exemplary direction of rotation illustrated by dotted line). Accordingly, the laser beam 20 may be scanned over the photoreceptor 22 in a single preset direction only (an exemplary scanning direction A is shown).

In various embodiments, the photoreceptor 22 may be a revolving (an exemplary direction of revolution is shown) photosensitive drum or belt, capable of holding an electrostatic charge on its surface while it is in the dark. At the start of an image forming operation, the surface of the photoreceptor 22 may be charged to a predetermined polarity and a predetermined voltage level. An exposure scanning for an image of a page may begin on the photoreceptor 22 with a laser beam 20 in synchronism with a reference signal (TOP signal) from the detector 24. Once the scanning starts, it may continue until the entire image of the page has been transferred to the photoreceptor 22. The scanning of the laser beam 20 on the photoreceptor 22 may result in a change in the charge distribution in the photoreceptor 22. The TOP signal may act as a vertical synchronization signal, and may be generated based on sensing an appropriate position of a printing medium, e.g., a paper. The TOP signal may be an indication of when to start the laser scanning of a first (or a topmost) scan line of an image page. Subsequently, through other operations well known to those skilled in the art (and therefore, not discussed here), the changed charge distribution in the photoreceptor 22 may finally result in printing the image on an appropriate medium, e.g., paper.

As discussed before, the laser scanning unit 18 may scan the laser beam 20 over the photoreceptor 22 in only one direction (direction A). Each scan may transfer one scan line of image to the photoreceptor 22. That is, for example, to print an image of 10 inches in length in a 600 dpi laser printer, the laser beam 20 has to be scanned 6000 times over the photoreceptor 22 in direction A.

Figure 2:
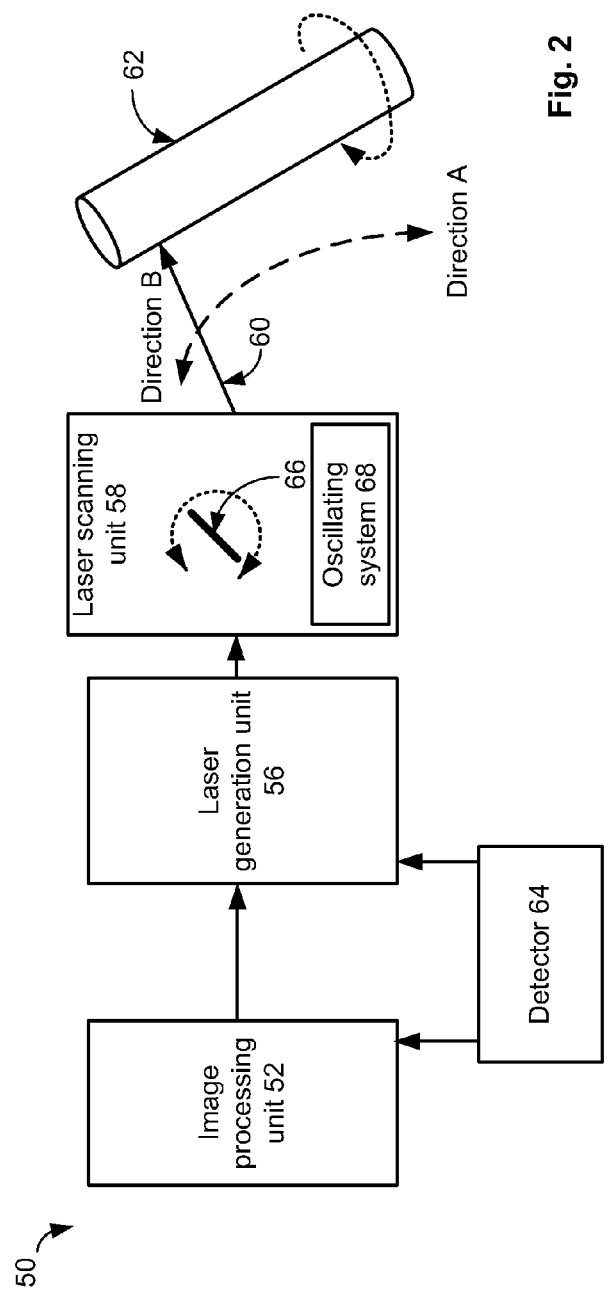
FIG. 2 illustrates a block diagram of a laser printer, in accordance with various embodiments of the present invention.

FIG. 2 illustrates a block diagram of a laser printer 50, in accordance with various embodiments of the present invention. The laser printer 50 may include a laser scanning unit 58, which may utilize an oscillating system 68 to drive a mirror 66 to scan a laser beam 60 over a photoreceptor 62. Unlike the motor 28 of FIG. 1 that may rotate in a single direction, the oscillating system 68 of FIG. 2 may oscillate, thereby producing an oscillating motion (shown by dotted line) in the mirror 66. In various embodiments, the oscillating system 68 may comprise a galvanometer. In various embodiments, by adjusting the current in the oscillating system 68, the oscillating system 68 and the mirror 66 may be made to oscillate at a preset frequency (which may be near or substantially equal to a mechanical resonance of the oscillating system 68). In various embodiments, the oscillating system 66 may include a magnet, and a coil may be used to set up alternating fields that may cause the magnet to rotate the mirror 66 in an oscillating motion. Accordingly, the laser beam 60 may be scanned over the photoreceptor 62 alternately in directions A and B. In various embodiments, the mirror 66 may be a single sided or a double sided mirror. As would be readily understood by those skilled in the art, other shapes and/or configuration (including a polygonal shape) of the mirror 66 may also be possible. The mirror 66 may be a part of a structure that is used to hold the mirror in place. In various embodiments, the mirror may be etched from silicon.

With each scan in either direction A or B, one scan line of an image may be transferred to the photoreceptor 62. That is, for example, to print an image of 10 inches in length in a 600 dpi laser printer, the laser beam 60 may be scanned alternately in directions A and B (i.e., A, B, A, B, . . . ), 3000 times in each direction.

FIG. 2 may also include a laser generation unit 56 to generate the laser beam. The generated laser beam may be suitably modulated by image data received from the image processing unit 52. Detector 64 may indicate the start of scanning by generating a reference signal (TOP signal). In various embodiments, the TOP signal may act as a vertical synchronization signal, and may be an indication of when to start the laser scanning for an image page. That is, the TOP signal may be an indication of when to start scanning the first (or the topmost) scan line of an image page. In various embodiments, the TOP signal may be generated in synchronism with the printing media, e.g., a paper, reaching a certain position within the printer, sensed by a paper position sensor (not shown).

As discussed before, with each scan of the laser beam 60 in either direction A or B, one scan line of an image may be transferred to the photoreceptor 62. In various embodiments, generation of the laser beam by the laser generation unit 56, for a scan line of image, would depend on the corresponding scanning direction (i.e., the scanning direction (A or B) of the laser beam 60 while transferring the scan line of image to the photoreceptor 62).

For example, if a scan line of image is to be transferred to the photoreceptor 62 while the scanning is being performed in direction A, the laser generation unit 56 may generate a laser beam corresponding to that scan line in a certain fashion. However, if the same scan line of image is to be transferred to the photoreceptor 62 while the scanning is being performed in direction B, the laser generation unit may generate the laser beam in a different fashion (e.g., in a reverse fashion). That is, generation of the laser beam for a scan line of image may be based in part on which direction the corresponding scanning would be performed. Accordingly, in various embodiments, image data to be generated by the image processing unit 52 for a scan line of image may also depend on the corresponding scanning direction.

For example, in various embodiments, the image processing unit 52 may generate image data for the first, second, third, . . . scan lines of an image page for scanning in directions A, B, A, . . . respectively. However, in case the first, second, third, . . . scan lines of the image page is scanned in directions B, A, B, . . . (i.e., reverse of the intended direction) respectively, it may create a distorted (possibly reversed) image.

To prevent such scenarios, a scan line generated for a certain scanning direction may be scanned in the intended scanning direction only. In various embodiments, this may be ensured by, for example, supplying prior information to the image processing unit 52 on which direction a scan line of image is to be scanned. However, since the oscillating mirror 66 may be oscillating prior to receiving the TOP signal, the oscillating mirror 66 may not be synchronized with the TOP signal, and it may not be known in advance what direction (A or B) the mirror would be moving while the TOP signal is received. Thus, the image processing unit 52 may not always have prior information about the direction of scanning of a scan line at the top of the image page while generating data for that scan line.

In various embodiments, the laser generation unit 56 and/or laser scanning unit 58 may skip a line of scanning so that the generated image data correctly corresponds to the scanning direction. For example, the image processing unit 52 may generate image data for the first, second, third, . . . scan lines of an image page to be scanned in directions A, B, A, . . . respectively. A TOP signal may be received from the detector 64, which may indicate the printer 50 is to start scanning, i.e. to start transferring first scan lines of the image to the photoreceptor 62. But at that moment, the position of the mirror 66 (and accordingly, the position of the laser beam 60) may be such that it may start scanning in direction B only. In contrast, the data corresponding to the first scan line of image, generated by the image processing unit 52, may be intended to be scanned in direction A only. Therefore, during the first scanning of the laser beam 60 over the photoreceptor 62 in direction B, no image data may be transferred. Transfer of image data (first, second, third, . . . scan lines) may begin only during the next scanning of the laser beam 60 in direction A. As the laser scanning unit 58 does not transfer any image data during the initial scanning in direction B, the image printed in the paper will have a blank first line, i.e. the entire image printed in the paper may be offset by one scan line.

In a 600 dpi printer, for example, the offset of one scan line may result in a downward shift of the entire image printed in the paper by 1/600 inch (length of one scan line). For monochrome printing, this shift, although undesirable, may not be noticeable. But in a color laser printer, when printing of one or more of the color planes (e.g., yellow, cyan, and/or magenta) of an image is offset by one scan line, the various color planes may not be properly overlapped in the printed page, which may result in a blurred or distorted image.

Figure 3:
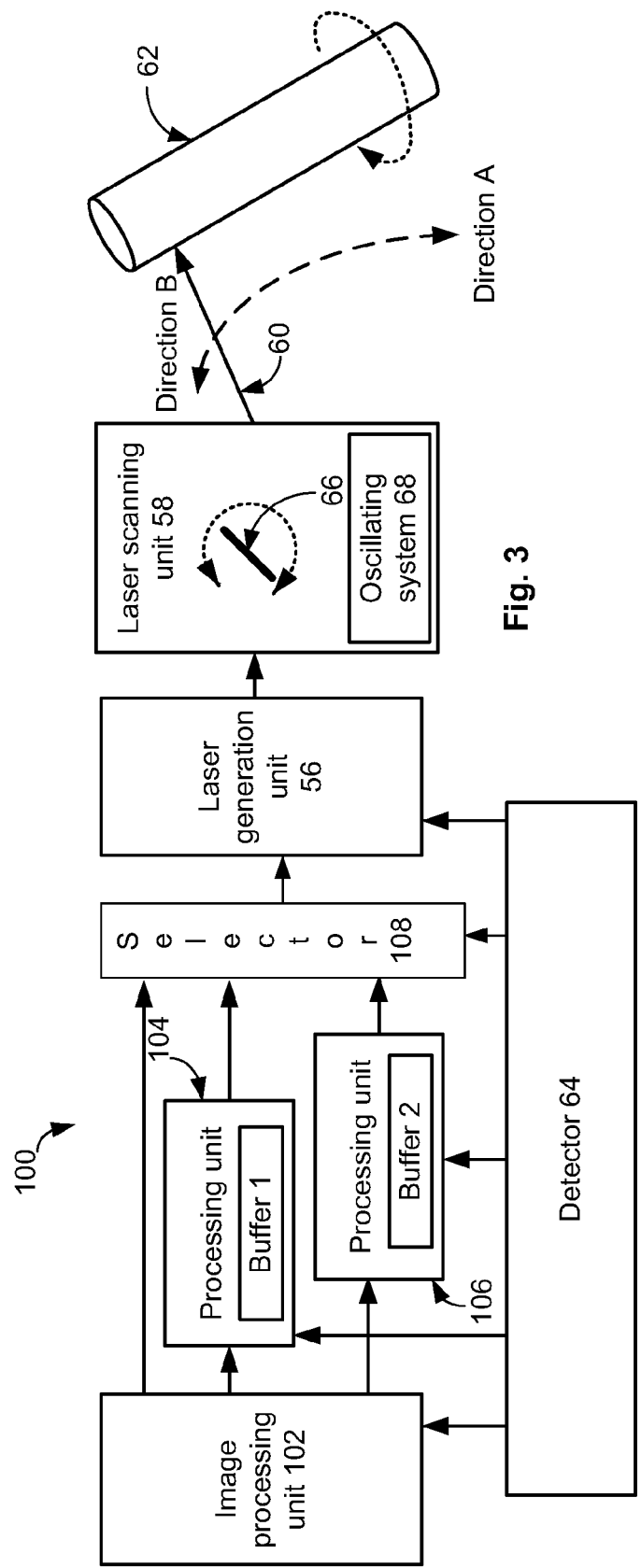
FIG. 3 illustrates another block diagram of a laser printer, in accordance with various embodiments of the present invention.

FIG. 3 illustrates a block diagram of a laser printer 100, in accordance with various embodiments of the present invention. The laser printer 100 may include a laser scanning unit 58, a photoreceptor 62, and a laser generation unit 56, similar to the printer 50 of FIG. 2.

FIG. 3 may include an image processing unit 102 to generate image data used to modulate the laser beam generated by the laser generation unit 56. FIG. 3 may also include processing units 104 and 106, each coupled between the image processing unit 102 and the laser generation unit 56. Each of the processing units 104 and 106 may receive image data from the image processing unit 102 and pre-render the data in a certain fashion, before transmitting the image data to the laser generation unit 56. Processing units 104 and 106 may include buffer 1 and buffer 2, respectively.

Although illustrated as separate blocks, in various embodiments, the processing units 104 and 106 may be a part of the image processing unit 102. The image processing unit 102 may perform the operations of the processing units 104 and 106, thereby obviating the need of separate processing units 104 and 106. That is, a single image processor (not illustrated) may perform the operations of the processing units 102, 104 and 106. In various embodiments, a single buffer may be dynamically partitioned to work as buffers 1 and 2. One or more buffers in the image processing unit 102 may also act as buffers 1 and 2. Also, in various embodiments, a main memory may be used to store pre-rendered data that is intended to be stored in buffers 1 and 2.

As discussed before, the image processing unit 102 may not know in advance which direction the scan lines may be actually scanned by the laser scanning unit 58. For example, the first, second, third, fourth, . . . scan lines of an image page may be scanned either in directions A, B, A, B, . . . , respectively, or in directions B, A, B, A, . . . , respectively. In various embodiments, the laser printer 100 of FIG. 3 may pre-render a plurality of scan lines for scanning in both possible directions. As a result, image data for the scan lines may be readily available to be rendered by the laser generation unit 56 for both possible directions, so that whenever the actual scanning direction is known, the corresponding image data may be timely selected by a selector 108 for generating the laser beam.

In various embodiments, the processing unit 104 may start pre-rendering a plurality of consecutive scan lines, starting with the first (topmost) scan line of the image page, for a first scanning path (e.g., direction A, B, A, . . . ), thereby generating a first pre-rendered set of data. Similarly, the processing unit 106 may start pre-rendering the same plurality of consecutive scan lines, starting with the first (or topmost) scan line of the image page, for a second scanning path (e.g., direction B, A, B, . . . ), thereby generating a second pre-rendered set of data. Pre-rendering the scan lines may include, for example, buffering the scan lines in the respective buffers (buffer 1 or 2) such that the buffered data is suitable for rendering in the associated scanning path. The processing units 104 and 106 may continue pre-rendering the scan lines for respective scanning paths until the actual initial scanning direction (i.e., the direction of scanning of the first or topmost scan line of the image page) of the laser beam is determined, based on which one of the pre-rendered data sets may be selected and rendered by the laser generation unit 56. For example, if it is determined that the initial scanning direction of the laser beam 60 for the first scan line of the image page would be direction B, then the second set of data corresponding to the second scanning path (B, A, B, . . . ), pre-rendered by processing unit 106, may be selected by the selector 108 for rendering by the laser generation unit 56. The set of data not selected (in this case, the first data set) may be discarded.

In various embodiments, the initial scanning direction may be known from the position of the oscillating system 68, mirror 66 and/or laser beam 60 at the time the TOP signal is generated. Any other appropriate sensing and/or detecting mechanism may be developed to determine the initial scanning direction.

In various embodiments, the processing units 104 and 106 may pre-render only the first few scan lines of the image page, which form a top portion of the image page. Once the actual initial scanning direction is determined, the first few scan lines pre-rendered by one of the selected processing units may be used by the laser generation unit 56. The image processing unit 102 may generate the remaining scan lines (from a bottom portion of the image page, which includes scan lines that were not pre-rendered) in accordance with the determined initial scanning direction and subsequently transmit such scan lines to the laser generation unit 56 via selector 108.

For example, in a 600 dpi printer, for a 10-inch image page with 6000 scan lines, the processing units 104 and 106 may pre-render only the top 600 scan lines for a first scanning path (e.g., A, B, A, . . . ) to generate the first set of data, and for a second scanning path (e.g., B, A, B, . . . ) to generate a second set of data, respectively. Once the initial scanning direction for the image page is determined as, for example, B, the second set of data corresponding to the second scanning path and pre-rendered by processing unit 106 may be selected by the selector 108, and rendered by the laser generation unit 56. The image processing unit 102 may calculate, based on the determined initial scanning direction B for the $1^{st}$ scan line, that the $601^{th}$ scan line is to be scanned in direction B. Based on this information, the image processing unit 102 may, in various embodiments, pre-render scan lines 601-6000 in direction B, A, B, . . . . Once the laser generation unit 56 has received scan lines 1-600 from the processing unit 106, the selector 108 may select to receive scan lines 601-6000 from the image processing unit 102, pre-rendered for the correct scanning direction B, A, B, . . . Thus, the processing units 104 and 106, in various embodiments, may pre-render only a small number of scan lines (e.g., in this case, 600 scan lines, or merely 10% of all scan lines in the image page), and consequently, may not need a large buffer capacity. As would be apparent to those skilled in the art, with an improvement in the processing speed and/or latency, less number of scan lines may be pre-rendered.

Figure 4:
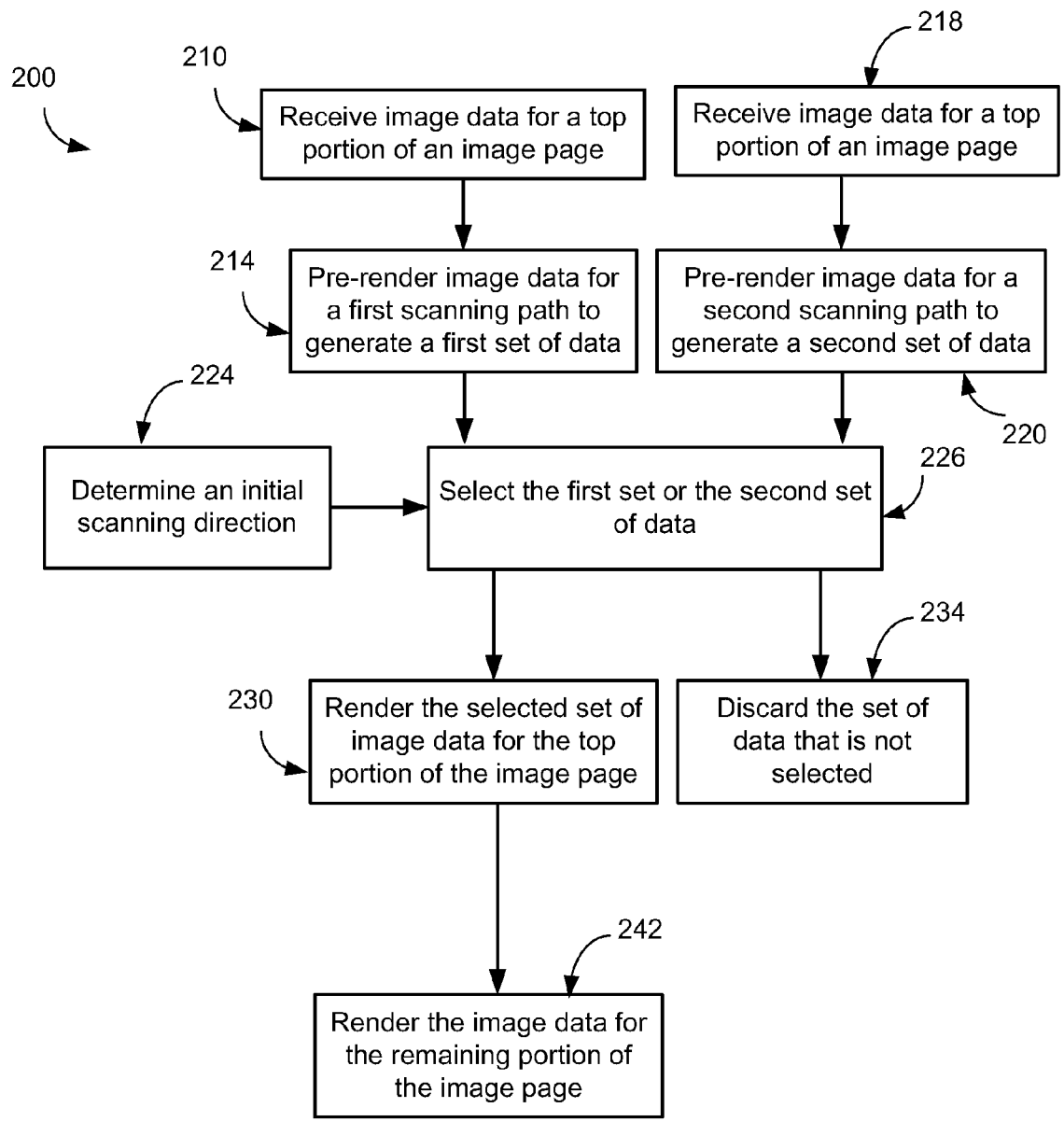
FIG. 4 illustrates a flow diagram for pre-rendering image data for a plurality of scanning paths, in accordance with various embodiments of the present invention.

FIG. 4 illustrates a flow diagram 200 for pre-rendering image data for a plurality of scanning paths, in accordance with various embodiments of the present invention. Referring to FIGS. 3 and 4, at 210, processing unit 104 may receive image data for a top portion of an image page from the image processing unit 102. Substantially concurrently, at 218, processing unit 106 may also receive image data for a top portion of an image page from the image processing unit 102. In various embodiments, processing units 104 and 106 may receive the same image data for the top portion of the image page. The received image data may correspond to a plurality of scan lines from the top portion of the image page. For example, if the image page includes n number of scan lines, only the top (or first) m number of scan lines (m<n, where both m and n are integers, and m is a preset number) may be received. Alternatively, in various embodiments, the processing units 104 and 106 may continue receiving scan lines until an initial scanning direction is determined. In some embodiments, the processing units 104 and 106 may continue receiving image data until it receives a preset number of scan lines or until an initial scanning direction is determined or until the buffers 1 and 2 are full (in case the received data is stored in the respective buffers 1 and 2), whichever occurs first.

At 214, the processing unit 104 may start pre-rendering the received image data for a first scanning path (e.g., in direction A, B, A, . . . ) to generate a first set of data. Substantially concurrently, at 220, the processing unit 106 may start pre-rendering the received image data for a second scanning path (e.g., in direction B, A, B, . . . ) to generate a second set of data. In various embodiments, however, the processing unit 106 may start pre-rendering the received image data for the second scanning path sequentially, i.e., after completion of pre-rendering the received image data for the first scanning path.

During or after the pre-rendering is complete in 214 and/or 220, an initial scanning direction for scanning the first scan line of the image page may be determined at 224. At 226, based on the determined initial scanning direction, one of the first set or the second set of pre-rendered image data may be selected by the selector 108. At 230, the selected set may be rendered by the laser generation unit 56 by generating a laser beam suitably modulated by the selected set of image data. At 234, the set of image data not selected may be discarded.

At 242, after rendering the selected set of image data for the top portion of the image page at 230, the laser generation unit 56 may render the image data for the remaining portion of the image page received from the image processing unit 102, thereby completely rendering the whole image page.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. A method comprising:
receiving data;
pre-rendering the data for a first scanning path to generate a first data set;
pre-rendering the data for a second scanning path to generate a second data set;
determining an initial scanning direction to provide a determined initial scanning direction;
responsive at least in part to the determining, selecting one of (i) the first data set or (ii) the second data set to generate a selected data set;
initially scanning a laser beam in the determined initial scanning direction, wherein the laser beam is modulated by the selected data set; and
subsequently, scanning the laser beam, modulated by the selected data set, alternately in a first scanning direction and a second scanning direction.

2. The method of claim 1, further comprising:
associating the first scanning path with a first possible initial scanning direction; and
associating the second scanning path with a second possible initial scanning direction.

3. The method of claim 2, wherein the selecting further comprises:
if the determined initial scanning direction corresponds to the first possible initial scanning direction, selecting the first data set; and if the determined initial scanning direction corresponds to the second possible initial scanning direction, selecting the second data set.

4. The method of claim 1, further comprising:
discarding either of (i) the first data set or (ii) the second data set that is not selected.

5. The method of claim 1, wherein the data that is received includes a plurality of scan lines corresponding to a top portion of an image page.

6. The method of claim 5, wherein the data that is received is first data, and wherein the method further comprises:
receiving second data that includes a plurality of scan lines corresponding to a bottom portion of the image page; and
responsive at least in part to the determined initial scanning direction, determining a third scanning path for the plurality of scan lines corresponding to the bottom portion of the image page, wherein the third scanning path corresponds to one of (i) the first scanning path or (ii) the second scanning path.

7. The method of claim 6, further comprising:
rendering the selected data set corresponding to the top portion of the image page by scanning a laser beam modulated by the selected data set; and
responsive at least in part to the third scanning path subsequently rendering the plurality of scan lines corresponding to the bottom portion of the image page by scanning the laser beam, wherein the laser beam is modulated by the plurality of scan lines corresponding to the bottom portion of the image page.

8. The method of claim 1, wherein:
the laser beam is scanned using an oscillating mirror; and
the oscillating mirror is controlled by a galvanometer.

9. The method of claim 8, wherein determining the initial scanning direction further comprises:
responsive at least in part to determining a position of the galvanometer, determining the initial scanning direction.

10. The method of claim 1, wherein pre-rendering the data for the first scanning path further comprises:
buffering the data in a first buffer.

11. The method of claim 1, wherein (i) the pre-rendering the data for the first scanning path and (ii) the pre-rendering the data for the second scanning path are performed substantially concurrently.

12. The method of claim 1, wherein the pre-rendering the data for the second scanning path is performed subsequent to the pre-rendering the data for the first scanning path.

13. A method comprising:
receiving data;
pre-rendering the data for a first scanning path to generate a first data set;
pre-rendering the data for a second scanning path to generate a second data set;
determining an initial scanning direction to provide a determined initial scanning direction;
responsive at least in part to the determining, selecting one of (i) the first data set or (ii) the second data set to generate a selected data set;
initially scanning a laser beam in the determined initial scanning direction, wherein the laser beam is modulated by the selected data set; and
subsequently, scanning the laser beam, modulated by the selected data set, alternately in a first scanning direction and a second scanning direction, wherein the pre-rendering the data for the second scanning path is performed subsequent to the pre-rendering the data for the first scanning path.

14. An apparatus comprising:
a processing unit configured to
receive data, and
pre-render the data for (i) a first scanning path to generate a first data set, and (ii) a second scanning path to generate a second data set;
a detector configured to detect an initial scanning direction to provide a detected initial scanning direction;
a selector configured to, responsive at least in part to the detected initial scanning direction, select one of (i) the first data set or (ii) the second data set to provide a selected data set; and
a laser generating unit configured to generate a laser beam responsive at least in part to the selected data set; and
a laser scanning unit configured to
initially scan the generated laser beam in the determined initial scanning direction, wherein the laser beam is modulated by the selected data set, and
subsequently, scan the laser beam, modulated by the selected data set, alternately in a first scanning direction and a second scanning direction.

15. The apparatus of claim 14, wherein:
the first scanning path is associated with a first possible initial scanning direction;
the second scanning path is associated with a second possible initial scanning direction; and
the selector is further configured to select (i) the first data set if the detected initial scanning direction corresponds to the first possible initial scanning direction, and (ii) the second data set if the detected initial scanning direction corresponds to the second possible initial scanning direction.

16. The apparatus of claim 14, wherein the processing unit comprises a first buffer configured to buffer the first data set.

17. The apparatus of claim 14, wherein:
the first data set includes a plurality of scan lines from a top portion of an image page, configured to be scanned in the first scanning path; and
the second data set includes the plurality of scan lines from the top portion of the image page, configured to be scanned in the second scanning path.

18. The apparatus of claim 17, wherein:
the data includes a plurality of scan lines from a remaining portion of the image page; and
the processing unit is further configured to determine a third scanning path for the plurality of scan lines from the remaining portion of the image page responsive at least in part to the detected initial scanning direction, wherein the third scanning path corresponds to one of (i) the first scanning path or (ii) the second scanning path.

19. The apparatus of claim 18, wherein the laser generating unit is further configured to:
generate a laser beam responsive at least in part to the selected data set; and
subsequently generate the laser beam corresponding to the third scanning path, responsive at least in part to the plurality of scan lines from the remaining portion of the image page.

20. The apparatus of claim 14, wherein the laser scanning unit comprises a galvanometer configured to drive an oscillating mirror to scan the laser beam over a photoreceptor.

21. A machine-accessible, non-transitory medium having associated instructions, which, when executed, results in a machine:
receiving data;
pre-rendering the data for a first scanning path to generate a first data set;
pre-rendering the data for a second scanning path to generate a second data set;
determining an initial scanning direction to provide a determined initial scanning direction;
responsive at least in part to the determining, selecting one of (i) the first data set or (ii) the second data set to generate a selected data set;
initially scanning a laser beam in the determined initial scanning direction, wherein the laser beam is modulated by the selected data set; and
subsequently, scanning the laser beam, modulated by the selected data set, alternately in a first scanning direction and a second scanning direction.

22. The machine-accessible, non-transitory medium of claim 21, wherein the associated instructions, when executed, further results in the machine:
associating the first scanning path with a first possible initial scanning direction; and
associating the second scanning path with a second possible initial scanning direction.

* * * * *